US005243169A

United States Patent [19]

Tateno et al.

[11] Patent Number: 5,243,169

[45] Date of Patent: Sep. 7, 1993

[54] MULTIPLE TORCH TYPE PLASMA GENERATION DEVICE AND METHOD OF GENERATING PLASMA USING THE SAME

[75] Inventors: Haruo Tateno, Kiyose; Akira Bunya; Susumu Matsuno, both of Ichikawa; Akira Nakamura, Tokyo; Hiroshi Saitoh, Funabashi; Tsutomu Itoh, Musashino; Hideo Nagasaka, Tokyo, all of Japan

[73] Assignee: Onoda Cement Co., Ltd., Onoda, Japan

[21] Appl. No.: 609,795

[22] Filed: Nov. 6, 1990

[30] Foreign Application Priority Data

Nov. 7, 1989 [JP] Japan ................................ 1-289160

[51] Int. Cl.[5] ............................................ B23K 9/00

[52] U.S. Cl. .......................... 219/121.51; 219/121.52; 219/121.5; 219/121.48

[58] Field of Search ........... 219/121.51, 121.5, 121.52, 219/121.48, 75

[56] References Cited

U.S. PATENT DOCUMENTS

| | | | |
|---|---|---|---|
| 3,770,935 | 11/1973 | Tateno et al. | 219/121.51 |
| 4,764,656 | 8/1988 | Browning | 219/121.44 |
| 4,780,591 | 10/1988 | Bernecki et al. | 219/121.52 |
| 4,813,510 | 5/1989 | Hatch | 219/121.52 |
| 4,818,837 | 4/1989 | Pfender | 219/121.5 |
| 4,907,407 | 3/1990 | Simon et al. | 219/121.51 |
| 4,958,767 | 9/1990 | Labrot et al. | 219/121.5 |
| 4,982,067 | 1/1991 | Marantz et al. | 219/121.5 |

*Primary Examiner*—Mark H. Paschall

*Attorney, Agent, or Firm*—Price, Heneveld, Cooper, DeWitt & Litton

[57] ABSTRACT

A plasma gas is injected from a vortex flow forming hole defined to an insulator in a tangential direction with respect to the circumference of the arc column of a torch to enable the axis of the arc column to be aligned with the axial of the torch and a vortex annular gas sheath is coaxially formed to thereby narrow down a plasma flame. Further, the torch comprises the above insulator and a casing which are connected in series each other.

21 Claims, 5 Drawing Sheets

MULTIPLE TORCH TYPE PLASMA GENERATION DEVICE AND METHOD OF GENERATING PLASMA USING THE SAME

BACKGROUND OF THE INVENTION

The present invention relates to a multiple torch type plasma generation device used for a plasma spray coating apparatus, artificial diamond manufacturing apparatus, cutting, jointing of metal and ceramics, reformation and surface treatment of substances, and the like, and a method of generating plasma in these apparatuses. More specifically, the present invention relates to an improved plasma generation technology used in a so-called plasma spray coating apparatus, and the like by which metal, ceramics and other substances are melted by, for example, a large current flowing in a gas, i.e., so-called arc, and plasma generated by the arc, and sprayed onto a target to be treated so that a rigid coating is formed thereon.

FIG. 9 shows main parts of a general purpose multiple torch type plasma spray coating device of prior art, wherein a main torch 1 is composed of an insulator 27 surrounding a main cathode 3, a main casing 4 having a discharge port, a second main casing 31, which surrounds the main casing 4, has a narrow port and is disposed coaxially with the main casing 4 through an insulator 29, and a main power supply 7 having a negative terminal connected to the main cathode 3 and a positive terminal connected to the main casing 4 and the second main casing 31 through switching means 8 and 34. A second main gas 33 to be used in the main torch 1 is supplied into the space defined between the main casing 4 and the second main casing 31 through a second gas supply port 32. Next, an auxiliary torch 2 is composed of an auxiliary torch start electrode 9, a first auxiliary casing 10, which surrounds the auxiliary torch start electrode 9, has a discharge port, and is mounted coaxially with the first torch start electrode 9 through an insulator 28, a second auxiliary casing 36 mounted coaxially with the auxiliary casing 10 through an insulator 30, and an auxiliary power supply 13 having a positive terminal connected to the positive terminal of the main power supply 7 and the auxiliary casing 10 of the auxiliary torch 2 and a negative terminal connected to the auxiliary torch start electrode through a switch means 14. An auxiliary gas 12 is supplied from an auxiliary gas supply port 11 and a second auxiliary gas 38 is supplied from a second auxiliary gas supply port 37.

The torches shown in FIG. 9 are started by the following sequence. First, the switch 8 is turned on so that the main power supply 7 causes main start arc 15 to be formed between the main cathode 3 and the discharge port of the main casing 4, and thus a main plasma gas 6 is heated to enable conducting plasma to be discharged from the extreme end of the main casing 4 of the main torch 1 through the narrow port of the second main casing 31. At the time, when the switch means 34 is turned on and then the switch means 8 is turned off, the main start arc 15 is extinguished by formed plasma, and at the same time the arc discharged from the extreme end of the main cathode 3 forms second main casing start arc 35, so that the main plasma gas 6 and the second main gas 33 are heated to enable a plasma flame 23 to be discharged to the outside of the main torch 1. Next, the switch means 14 is turned on so that the auxiliary power supply 13 enables auxiliary start arc 16 to be formed between the auxiliary casing 10 and the auxiliary torch start electrode 9, and thus the auxiliary gas 12 is heated by the arc to form conductive plasma to be discharged from the discharge port of the auxiliary casing 10. The conductive plasma is further discharged to the outside of the auxiliary torch 2 through the narrow port at the extreme end of the second auxiliary casing 36. Upon the completion of these processes, the conductive plasma discharged from the main torch 1 and the auxiliary torch 2 forms a conducting path, because these torches are disposed such that the axes thereof intersect each other. When the switches 34 and 14 are turned off at this stage, the main power supply 7 forms steady hair pin arc 17 from the extreme end of the main cathode 3 toward the outer surface of the discharge port of the auxiliary casing 10. When and amount of the gas to be supplied into the main torch and an amount of the gas to be supplied into the auxiliary torch 2 are adjusted, respectively at the time, the plasma flame 23 substantially aligned with the axis of the main torch 1 is formed, as shown in FIG. 9. At the time, the direction of the arc getting to the auxiliary casing 10 serving an anode of the steady hair pin arc 17 is substantially aligned with the axis of the auxiliary torch 2, but the arc is curved toward the direction in which the plasma flame 23 is discharge by being attracted thereby. As a result, the inner wall of the narrow portion of the second auxiliary casing 36 is partially damaged and a degree of the damage is increased as the plasma torch is operated for a longer time, and the plasma torch cannot be finally operated. Thus, a problem arises in that the plasma torch cannot be stably operated at a high output for a long time.

A thermal spray material 20, which is supplied toward the plasma flame 23 through a material supply tube 19, is quickly heated to a high temperature by high temperature laminar flow plasma 18 having a high enthalpy and melted, and goes to a substrate 25 without spreading to a wide area, by being accompanied with the plasma flame 23, as shown by fused spray particles 21. A plasma separation means 22 provided with a flame casing 26 and located just in front of the substrate 25 separates only the plasma 18 from the plasma flame 23 containing the fused spray particles 21, and the fused spray particles 21 comes into collision with the substrate just after the separation to thereby form a sprayed coating 24.

In the above description, the inner wall of each of the main casing 4, the second main casing 31, the auxiliary casing 10, and the second auxiliary casing 36 is arranged as a jacket, and thus the interior thereof is cooled by circulating water, and the like, but this arrangement is not shown in FIG. 9. Further, the cooling systems are omitted in the following description.

SUMMARY OF THE INVENTION

Taking the above into consideration, an object of the present invention is to solve the following problems.

A first problem to be solved by the present invention is that since a multiple torch type plasma spray coating apparatus of prior art using laminar plasma cannot narrow down a plasma flame in a turbulent flow region, it cannot effect a thermal spraying in an extended and stable state and thus effects a thermal spraying using laminar plasma with a relatively low arc output of, e.g., 17 KW, with the result that a high quality sprayed coating cannot be obtained when a thermal spray material such as tungsten carbide in need of hypersonic speed plasma and the like is used.

A second problem is that when hair pin arc, which is one of the features of the multiple torch type plasma spray apparatus is formed, arc getting to an auxiliary torch is curved by being attracted to a plasma flame from a main torch, which greatly and partially damages mainly the downstream side of the narrow port inner wall of the auxiliary torch and prevents the torch from being stably operated for a long time at a high output.

A third problem is that the multiple torch type plasma spray coating apparatus has two or more torches each having such a multiple structure that an insulator surrounding a cathode is coaxially disposed therewith, then a casing surrounding the insulator is disposed and so on, and thus as a number of these components are sequentially assembled, a diameter of the torch is increased and made larger as compared with an output of the torch, the components of the torch are difficult to be coaxially assembled, the manufacturing cost thereof is expensive, the torch needs a multiple maintenance and is not good in portability, because of the increased weight thereof. As a result, this type of the torch has a large problem when it is commercially used.

The gist of the present invention as a first eminent feature is that a gas supply means is provided to enables a strong circulating gas flow to be formed around an arc column and the axis of the arc column to be aligned with the axis a torch, a circulating annular gas sheath is coaxially formed therewith, the length of all the narrow ports of the casings of a main torch casing and auxiliary torch are extended within the range in which the arc column does not pass through the sheath, a potential difference between the start point and the end point of arc, i.e., an arc voltage is increased, a power effectively used by the arc which is determined by the product of an arc current and the arc voltage is increased. A thermal load applied to the narrow port inner walls of all the main torch casing and the auxiliary torch casing is greatly reduced, by a vortex gas sheath and the arc current is increased, and thus a so-called pinch effect is accelerated due to the above arrangement, the arc is more converged, a plasma flame is narrowed down and extended, and a direction in which plasma is injected is stabilized to enable a thermal spraying to be effected at a high output, high temperature and high speed.

A second eminent feature is that a heat insulating material such as ceramics, and the like is used as an insulator for a torch constituting the multiple torch and all the insulators and casings having the same diameter are coaxially disposed to thereby provide the torch with a compact and simple arrangement.

PREFERRED EMBODIMENTS

Figure 1:
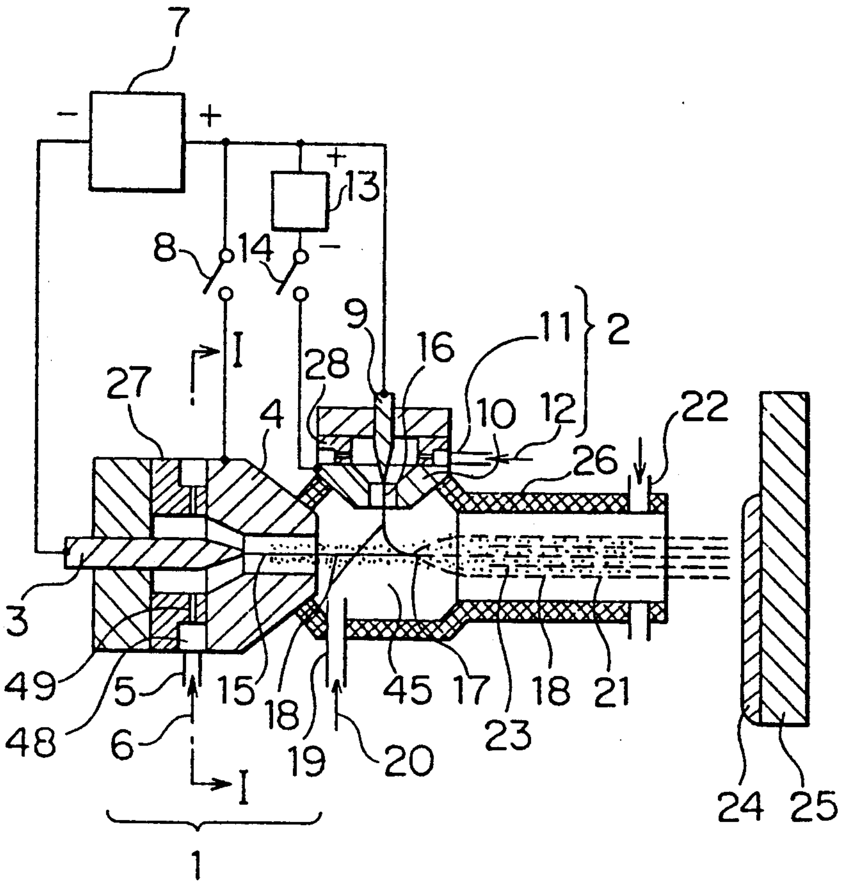
FIG. 1 is a vertical cross sectional view showing an embodiment according to the present invention.
Figure 2:
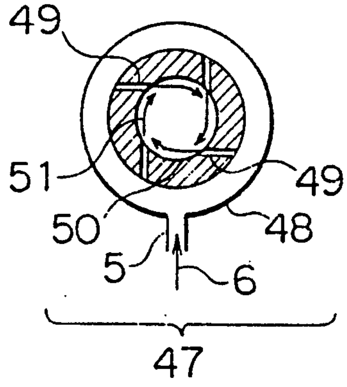
FIG. 2 is a cross sectional view taken along the line I—I of FIG. 1.

FIG. 1 is a first embodiment by which a multiple torch type plasma spray coating apparatus according to the present invention is implemented. In FIG. 1, a main cathode 3 is coaxially held by a main casing 4 having a narrow port and an insulator 27 having a vortex gas formation means 47. As shown in FIG. 2, a main plasma gas 6 is first supplied from a main plasma gas inlet 5 into a gas annular chamber 48, and then further supplied in the direction shown by arrows 51 through a single vortex flow forming hole 49 or a plurality of vortex flow forming holes 49 defined at equal intervals so that the plasma gas 6 is circulated along the inner wall 50 of the insulator 27. The vortex flow forming hole 49 is defined in a tangential direction with respect to the axis of a torch 1. A main power supply 7 has a negative terminal connected to the main cathode 3 and a positive terminal connected to the main casing 4 through a switch means 8. The main torch 1 is composed of the above-mentioned components. Next, an auxiliary start electrode 9 is disposed such that it intersects the axis of the main torch 1, i.e., the axis of the main cathode 3 and coaxially held by an auxiliary casing 10 surrounding the main cathode 3 and having a discharge port at the extreme end thereof and an insulator 28 having a vortex gas formation means 47 similar to that of the insulator 27 of the main torch 1. An auxiliary power supply 13 has a negative terminal connected to the auxiliary casing 10 through a switch means 14 and a positive terminal connected both the auxiliary torch start electrode 9 and the positive terminal of the main power supply 7. According to one aspect of the invention, the narrow port of torch 2 is smaller than the narrow port of torch 1.

In FIG. 1, when an inert gas such as argon or the like is supplied from the main plasma gas inlet 5 as the main plasma gas 6 and the switch means 8 is turned on to impose a voltage from the main power supply 7 across the main cathode 3 and the main casing 4 to thereby start the main torch by a not-shown power supply for starting, main start arc 15 is formed from the extreme end of the main cathode 3 toward the narrow port of the main casing 4 and heats the main plasma gas 6, and the plasma gas 6 is transformed to plasma 18 and discharged from the extreme end of the main casing 4 toward the outside from the extreme end of the main casing 4. Next, when the switch means 14 is turned on to impose a voltage from the auxiliary power supply 13 across the auxiliary torch start electrode 9 and the auxiliary casing 10 and an inert gas such as argon or the like is supplied from an auxiliary gas inlet 11 as an auxiliary gas 12, auxiliary start arc 16 is generated and plasma is injected from the narrow port at the extreme end of the auxiliary casing 10. With this arrangement, the plasma 18 injected from the extreme ends of the main torch 1 and the auxiliary torch 2 intersect at the extreme ends thereof, because the axis of the main torch 1 intersects the axis of the auxiliary torch 2. Since the plasma 18 has a conducting property, it forms a conducting path from the extreme end of the main cathode 3 to the extreme end of the auxiliary start electrode 9 in this state. When the switch means 8 and 14 are turned off after this state has been completed, a voltage from the main power supply 7 is imposed across the extreme end of the main cathode 3 and the extreme end of the auxiliary torch start electrode 9, which forms steady hair pin arc 17 directed from the extreme end of the main cathode 3 to the extreme end of the auxiliary torch start electrode 9. When a structure of the main torch 1, an amount of the main plasma gas 6 to be supplied thereinto, a structure of the auxiliary torch 2, and an amount of the auxiliary gas 12 to be supplied thereinto are suitably selected, a plasma flame 23 having substantially the same axis as that of the main torch 1 can be formed, as shown in FIG. 1. The thus generated steady hair pin arc 17 has the start and end points thereof securely fixed to the extreme ends of the main cathode 3 and the auxiliary torch start electrode 9, respectively, and since the extreme ends the hair pin arc 17 are protected by the inert gas, the main plasma gas 6 to be supplied into the main torch 1 can be set to an any arbitrary amount ranging from an large flow amount to a small flow amount. A thermal spray material 20, which is supplied toward the plasma flame 23 through a material supply tube 19, is quickly heated to a high temperature by the high temperature plasma 18 having a high enthalpy and melted, and goes to a substrate 25 without spreading to a wide area, by being accompanied with the plasma flame 23, as shown by fused spray particles 21. A plasma separation means 22 located just in front of the substrate 25 separates only the plasma 18 from the plasma flame 23 containing the fused spray particles 21, and the fused spray particles 21 comes into collision with the substrate just after the separation to thereby form a coating 24.

At the time, the provision of the means for supplying a gas, by which a strong vortex gas flow is formed around the arc column, enables the axis of the arc column to be aligned with the axis of the torch and a vortex annular gas sheath to be coaxially formed, with the result that the plasma flame 23 is narrowed down in a turbulent flow region in which the prior art multiple torch type plasma spray coating apparatus forming a laminar plasma flame cannot narrow down the plasma flame, and thus a spray coating can be effected in an extended and stable state at a high density, a thermal spray material is well melted and sprayed to the substrate at a high speed to thereby provide a high quality coating at an increased efficiency.

Figure 3:
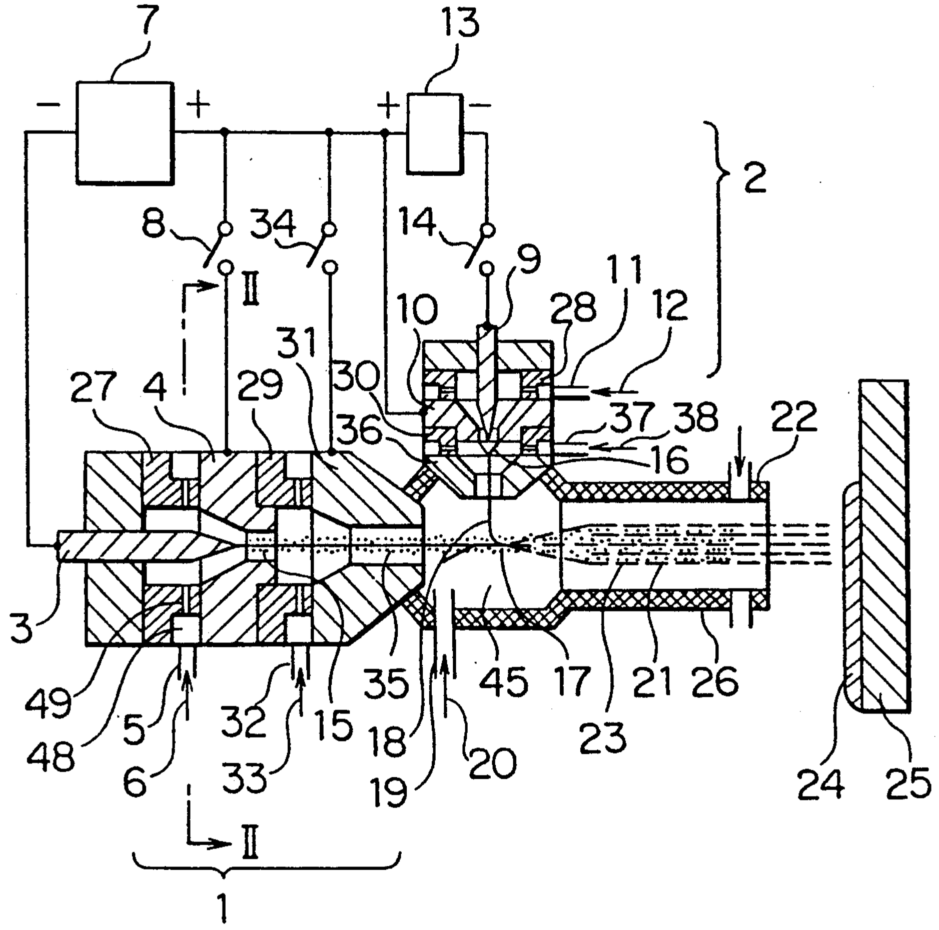
FIG. 3 is a vertical cross sectional view of an embodiment wherein a torch is composed of two sets of insulators and casings.
Figure 4:
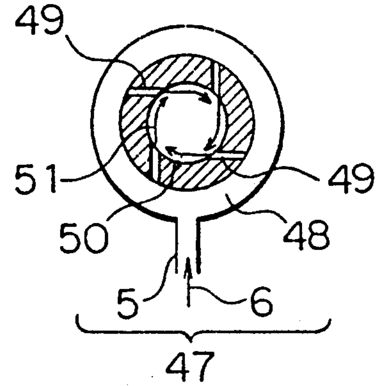
FIG. 4 is a cross sectional view taken along the line II—II of FIG. 3.
Figure 6:
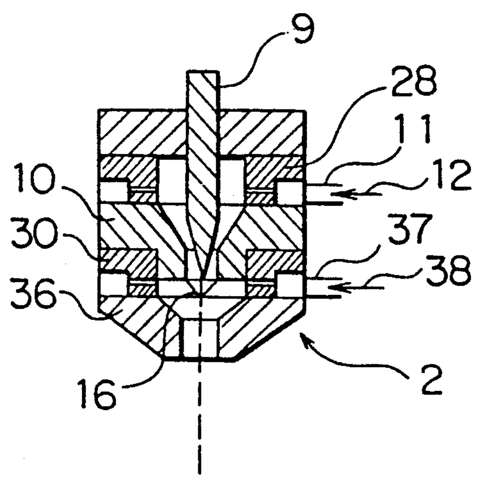
FIG. 6 is a vertical cross sectional view showing an embodiment of an auxiliary torch.
Figure 9:
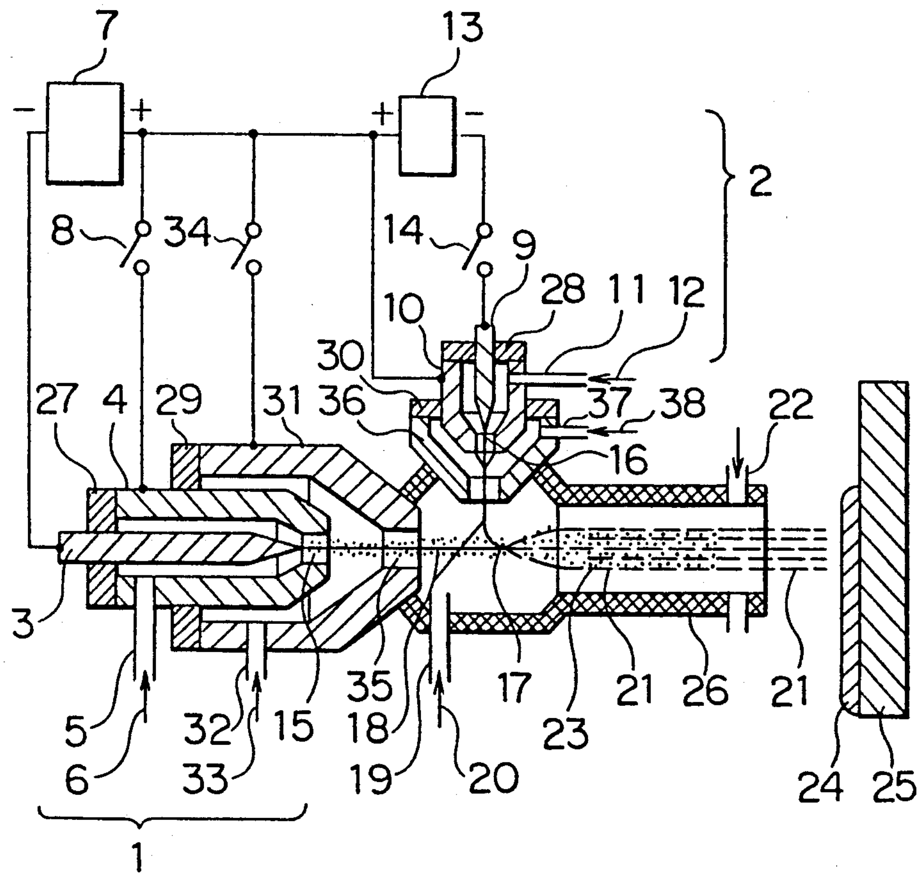
FIG. 9 PRIOR ART
FIG. 9 is a vertical cross sectional view of a prior art embodiment.

FIG. 3 shows main parts of a general purpose multiple torch type plasma spray coating apparatus, wherein a main torch 1 is composed of an insulator 27 having a main gas inlet, a main casing 4 having a discharge port, an insulator 29 having a second main gas inlet 32, a second main casing 31 having a discharge port each coaxially disposed in alignment with the axis of a main cathode 1, the insulators 27 and 29 and the casings 4 and 31 having the same diameter, and a main power supply 7 having a negative terminal connected to the main cathode 3 and a positive terminal connected to the main casing 4 and the second main casing 31 through switch means 8 and 34, respectively. As shown in FIG. 4, at the time, a main plasma gas 6 or a second main gas 33 is first supplied into an gas annular chamber 48 from the main gas inlet 5 or the second main gas inlet 32, and then further supplied in the direction shown by arrows 51 through a single vortex flow forming hole 49 or a plurality of vortex flow forming holes 49 defined at equal intervals so that the plasma gas 6 is circulated along the inner wall 50 of the insulator 27 or 29. Next, an auxiliary start electrode 9 is disposed such that it intersects the axis of the main torch 1, and coaxially held by an insulator 28, a first auxiliary casing 10 having a discharge port, an insulator 30 and a second auxiliary casing 36 coaxially disposed in this order, and further an auxiliary gas 12 is supplied from the auxiliary gas inlet 11 defined to the insulator 28 having a vortex gas formation means 47 similar to that of the insulator 27 or 29 of the main torch 1, and a second auxiliary gas 38 is supplied through the second auxiliary gas inlet 37 defined to the insulator 30. An auxiliary power supply 13 has a positive terminal connected to the positive terminal of the main power supply 7 and the auxiliary casing 10 of the auxiliary torch 2 and a negative terminal connected to the auxiliary torch start electrode 9 through a switch means 14. A second auxiliary torch 2 is composed of the above-mentioned components. The respective torches shown in FIG. 3 are started by the following sequence. The switch means 8 is turned on to enable the main power supply 7 to first form main start arc 15 between the main cathode 3 and the discharge port of the main casing 4 to thereby heat the main plasma gas 6, and conducting plasma is discharged from the extreme end of the main casing 4 of the main torch 1 through the narrow port of the second main casing 31. When the switch means 34 is turned on and then the switch means 8 is turned off at the time, the main start arc 15 is removed, and at the same time arc discharged from the extreme end of the main cathode 3 forms second main casing start arc 35 to thereby heat the main plasma gas 6 and the second main gas 33, so that a plasma flame 23 is discharged to the outside of the main torch 1. Next, when the switch means 14 is turned on to enable the auxiliary power supply 13 to form auxiliary start arc 16 between the auxiliary casing 10 and the auxiliary torch start electrode 9, the auxiliary gas 12 is heated by the arc, and the conducting plasma 18 discharged from the discharge port of the auxiliary casing 10 is further discharged to the outside of the auxiliary torch 2 through the narrow port at the extreme end of the second auxiliary casing 36. Upon completion of these processes have been completed, the conductive plasma 18 discharged from the extreme ends of the main torch 1 and the auxiliary torch 2 forms a conducting path, because the axis of the main torch 1 intersects the axis of the auxiliary torch 2. When the switch means 34 and 14 are turned off at this stage, the main power supply 7 forms steady hair pin arc 17 directed from the extreme end of the main cathode 3 to the outer surface of the discharge port of the auxiliary casing 10. When an amount of the gas to be supplied into the main torch 1 and an amount of the gas to be supplied into the auxiliary torch 2 are adjusted, respectively, at the time, the plasma flame 23 having substantially the same axis as that of the main torch 1 is formed, as shown in FIG. 3. At the time, the extreme end of the auxiliary torch start electrode 9 of the auxiliary torch 2 is caused to be located in the vicinity of the exit surface of the discharge port of the first auxiliary casing 10, as shown in FIG. 6, although, in the prior art, the auxiliary torch start electrode 9 of the auxiliary torch 2 is located in front of the discharge port of the first auxiliary casing 10 and the anode point thereof is located on the inner wall of the discharge port, as shown in FIG. 9. As a result, the anode point of the auxiliary start arc 16 can be formed on the exit surface of the discharge port of the first auxiliary casing 10 and the auxiliary start arc 16 can be extended longer from the exit of the auxiliary torch 2 than that of the prior art shown in FIG. 9, and thus the steady hair pin arc 17 can be easily formed. Further, the provision of the means for supplying a gas, by which a strong vertex gas flow is formed around the arc column of the auxiliary torch 2, enables the axis of the arc column to be aligned with the axis of the auxiliary torch and a vertex annular gas sheath to be coaxially formed, so that a thermal load applied to the discharge port of the auxiliary casing 10 and the narrow port inner walls of the second auxiliary casing 36 of the auxiliary torch 2 is equally reduced, the walls are not partially damaged by the arc, and the torch can be stably operated without the need for maintenance and check. A thermal spray material 20, which is supplied toward the plasma flame 23 through a material supply tube 19, is quickly heated to a high temperature by high temperature plasma 18 having a high enthalpy and melted, and goes to a substrate 25 without spreading to a wide area, by being accompanied with the plasma flame 23, as shown by fused spray particles 21. A plasma separation means 22 located just in front of the substrate 25 separates only the plasma 18 from the plasma flame 23 containing the fused spray particles 21, and the fused spray particles 21 comes into collision with the substrate just after the separation to thereby form a coating 24. At the time, the provision of the means for supplying a gas, by which a strong vertex gas flow is formed around the arc column, enables the axis of the arc column to be aligned with the axis of the torch and a vertex annular gas sheath to be coaxially formed, with the result that the plasma flame 23 is narrowed down in a turbulent flow region in which the prior art multiple torch type plasma spray coating apparatus forming a laminar plasma flame cannot narrow down the plasma flame, and thus a spray coating can be effected in an extended and stable state at a high density, a thermal spray material is well melted and sprayed at a high speed to the substrate to thereby provide a high quality coating at an increased efficiency.

Note that since the main cathode 3 is protected an inert gas such as argon or the like as the main plasma gas, an active gas such as air, oxygen, or the like can be used as the second main gas 33, or a composite gas can be used if it is needed for the other objects, and thus obtained is such an effective result that a field to which this torch can be applied is increased and an operating cost thereof is reduced.

Figure 7:
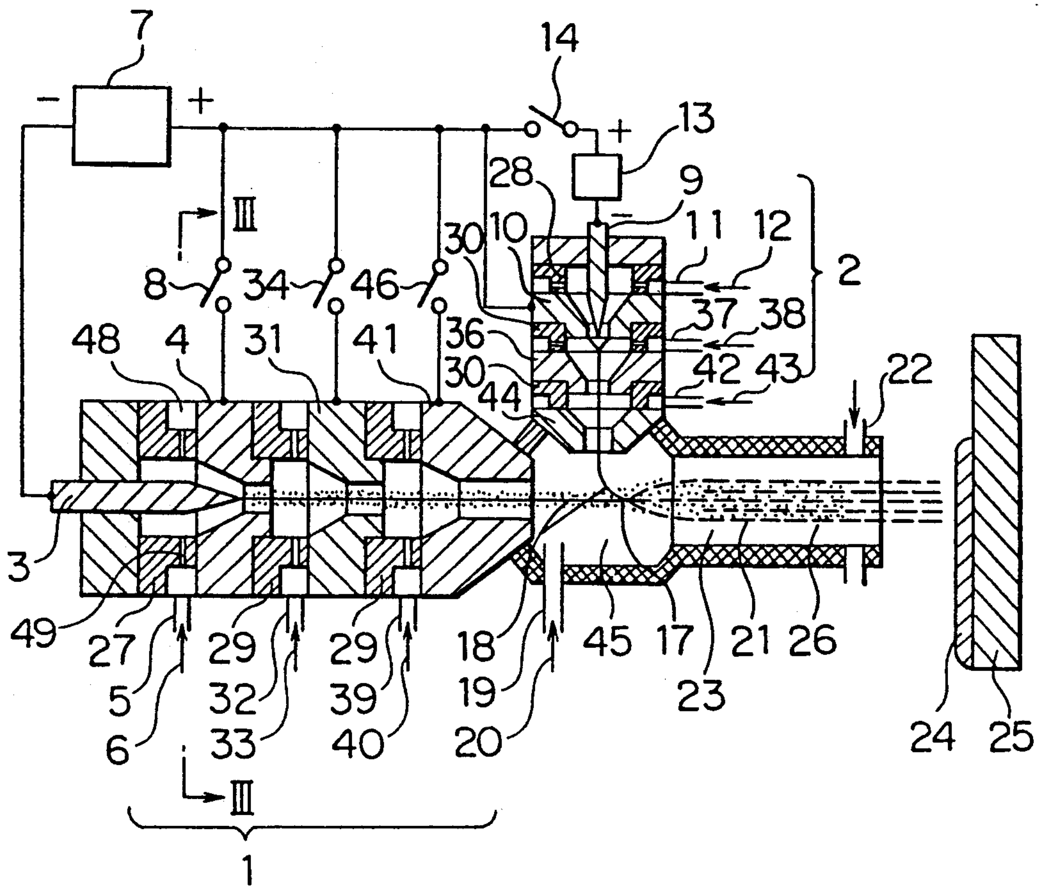
FIG. 7 is a vertical cross sectional view of an embodiment wherein a torch is composed of three sets of insulators and casings.
Figure 8:
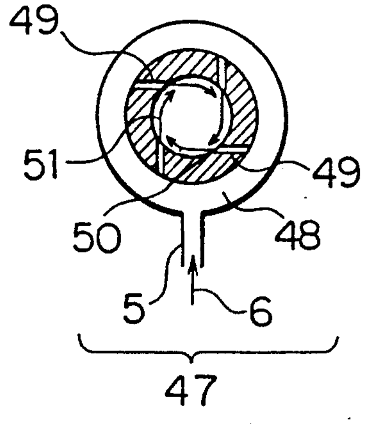
FIG. 8 is a cross sectional view taken along the line III—III of FIG. 7.

FIG. 7 shows an embodiment preferably applied to the cases in which a large capacity is particularly needed and a ratio of an active gas contained in a plasma gas is to be increased. A main torch 1 of the embodiment is composed of an insulator 27 having a main gas inlet 5, a main casing 4 having a discharge port, an insulator 29 having a second main gas inlet 32, a main casing having a discharge port, an insulator 29 having a second main gas inlet 32, a second main casing 31 having a discharge port, an insulator 29 having a third main gas inlet 39, a third main casing 41 having a narrow port disposed in this order toward the extreme end of an main cathode 3 in alignment with the axis of thereof, the above components having the same diameter, and a main power supply 7 having a negative terminal connected to the main cathode 3 and a positive terminal connected to the main casing 4, the second main casing 31, and the third main casing 41 through switch means 8, 34 and 46, respectively. At the time, as shown in FIG. 8, a main plasma gas 6, a second main gas 33, or a third main gas 40 is first supplied into an gas annular chamber 48 from the main gas inlet 5, the second main gas inlet 32, or the third main gas inlet 39, and then further supplied in the direction shown by arrows 51 through a single vertex flow forming hole 49 or a plurality of vertex flow forming holes 49 defined at equal intervals so that the plasma gas 6 is circulated along the inner wall 50 of the insulator 27 or 29. Next, an auxiliary start electrode 9 is disposed such that it intersects the axis of the main torch 1, and an insulator 28 having an auxiliary gas inlet 11, a first auxiliary casing 10 having a discharge port, an insulator 30 having a second auxiliary gas inlet 37, a second auxiliary casing 36 having a discharge port, an insulator 30 having a third auxiliary gas inlet 42, and a third auxiliary casing 44 having a discharge port are coaxially disposed in this order toward the extreme end of the auxiliary torch start electrode 9 in alignment with the axis thereof. At the time, an auxiliary gas 12 is supplied from the auxiliary gas inlet 11 defined to the insulator 28 having a vertex gas formation means 47 similar to that of the insulators 27 or 29 of the main torch 1, a second auxiliary gas 38 is supplied from the second auxiliary gas inlet 37 defined to the insulator 30, and a third auxiliary gas 43 is supplied from the third auxiliary gas inlet 42 defined to the insulator 30.

As shown in FIG. 7, an auxiliary power supply 13 has a negative terminal connected to the auxiliary torch start electrode 9 and a positive terminal connected to the positive terminal of the main power supply 7 through a switch means 14 and also connected to the auxiliary casing 10. A second auxiliary torch 2 is composed of the abovementioned components. The system shown in FIG. 3 is started by the following sequence. The switch means 8 and 34 of the main torch 1 are sequentially turned on and off and only the switch means 46 is turned on to enable conductive plasma to be discharged from the extreme ends of the main torch 1 and the auxiliary torch 2. After the plasma has intersected each other and formed an conductive path between the cathodes of both the torches, the switch means 46 and 14 are turned off to form steady hair pin arc 17 to thereby generate plasma 18. With this arrangement, a plasma coating according to the present invention is effected as shown in FIG. 7 in the same way as shown in FIGS. 1 and 3. In this system, inert gas such as argon is used as the main plasma gas 6, the auxiliary gas 12, and the second auxiliary gas 38 to protect the electrode and the casings, but a reactive active gas such as air, oxygen or the like can be used as a plasma gas for the second main gas 33, the third main gas 40 and the third auxiliary gas 43.

With this arrangement, a ratio of the active gas contained in the plasma gas as a whole used in the torch can be increased, with the result that a coating composed of such a substance as ferrite, alumina, titania, or the like, which greatly dislikes a reducing atmosphere and can exhibit a unique high performance in an oxidizing atmosphere, can be easily formed, which is one of eminent features of the present invention.

Figure 5:
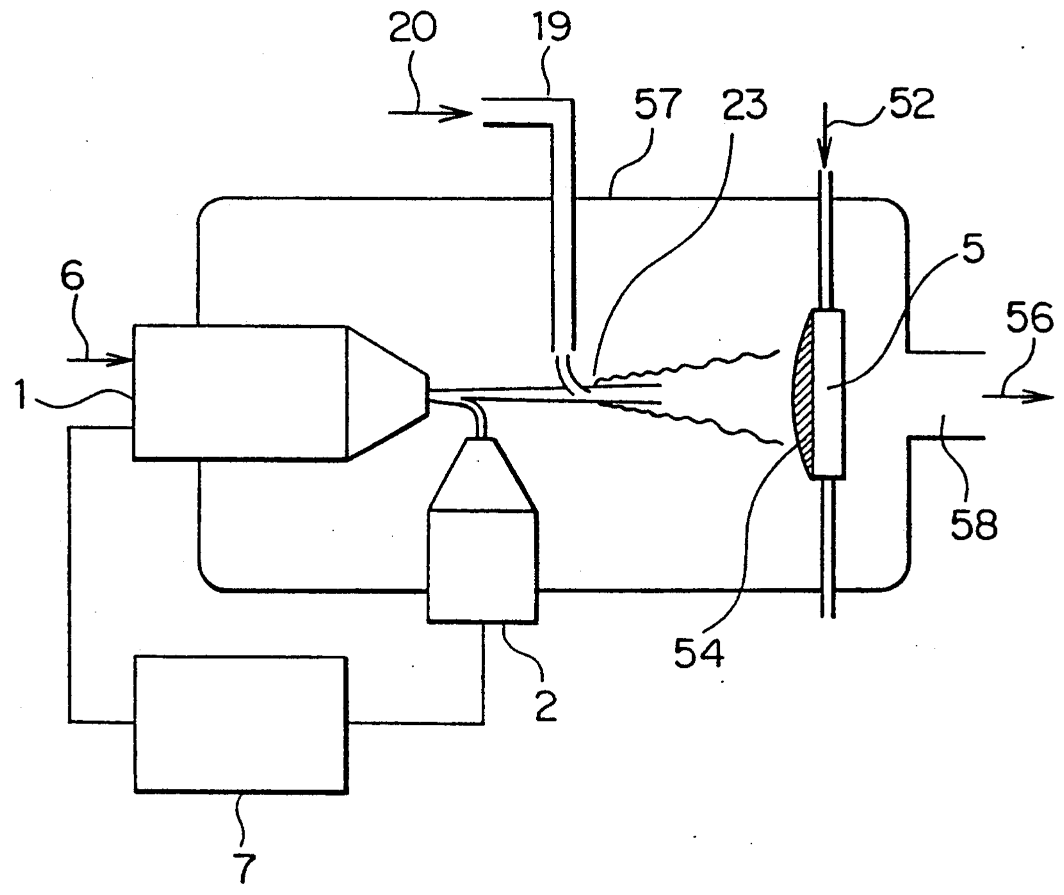
FIG. 5 is a front view of a diamond manufacturing apparatus using a plasma generation device according to the present invention.

FIG. 5 shows and embodiment by which artificial diamond is made using the plasma generation device according to the present invention. The artificial diamond is made in such a manner that a material gas such as a material gas 20 composed of methane and hydrogen, which has been injected from a material supply tube 19 into a ultra-high temperature plasma flame 23 generated by the above-mentioned multiple torch type plasma generation apparatus composed of the main torch 1 and the auxiliary torch 2 of the abovementioned embodiment, is melted and sprayed onto a substrate 53 cooled by a cooling water 52 to form a diamond film 54 on the surface thereof, and at the time an exhaust gas 56 is exhausted from the exhaust port 58 defined to a housing 57. Further, the diamond also can be synthesized by supplying, for example, hydrogen to the main torch 1 and/or the auxiliary torch 2.

Note that the above embodiments use only one auxiliary torch, but a plurality of the auxiliary torches may be provided and arranged, for example, as described below.

Although not shown, two or three auxiliary torches are disposed in a circumferential direction at equal intervals in such a manner that they surround the axis of the main torch and the axes of the auxiliary torches intersect the axis of the main torch at the one point thereof.

When a plurality of the auxiliary torches are used as described above, arc can be more stabilized.

In the plasma coating according to the present invention, the gas supply means is provided to enable a strong vortex gas flow to be formed around the arc column to thereby enable the axis of the arc column to be aligned with the axis of the torch and the vortex annular gas sheath to be coaxially formed therewith, with the result that the length of all the narrow ports of the main torch casings and then auxiliary torch casings is extended in the range in which the arc column does not pass through the sheath so that a potential difference between the start point and the end point of arc, i.e., an arc voltage is increased, a power effectively used by the arc which is determined by the product of an arc current and the arc voltage is increased, and a thermal load applied to the narrow port inner walls of all the main torch casings and the auxiliary torch casings is greatly reduced. More specifically, a cooling efficiency of the torch as a whole can be reduced to substantially 30% from a conventional ratio of 50%, whereby the arc current is increased and at the same time a pinch effect is accelerated, the arc is more converged, a plasma flame is narrowed down to a high density and extended, a spray coating can be effected at a high output, high temperature and high speed, a larger amount of a spray coating material can be supplied, and a film of high quality can be provided. As an example, when a spray coating was effected using yttria stabilized zirconia ($Y_2O_3$—$ZrO_2$) having a particle size from 44 to 10 $\mu m$ as the thermal spray material, an amount of a gas passing through a film made by the material could be securely reduced to one half or less that obtained by the prior art torch type plasma spray coating apparatus.

Further, according to the plasma spray coating apparatus according to the present invention, the provision of the means for supplying a gas, by which a strong vortex gas flow is formed around the arc column getting to the auxiliary torch, enables the axis of the arc column to be aligned with the axis of the auxiliary torch and a vortex annular gas sheath to be coaxially formed, so that a thermal load applied to the narrow port inner walls of all plural the auxiliary torches is equally reduced, the inner walls are not partially damaged by the arc, and the torch can be stably operated without the need for maintenance and check. Further, the use of a vortex gas flow can reduce a total amount of gas used in all the auxiliary torches by about 50% as compared with that used in the prior art multiple torch type plasma spray coating apparatus for the same arc output, and stable steady hair pin arc can be also formed.

Further, in the plasma spray coating apparatus according to the present invention, the insulator used in each torch constituting a multiple torch is composed of a heat resistant material such as ceramics and all the insulators and casings are coaxially disposed in series, so that the size of the torch can be reduced. More specifically, the cost for manufacturing the same type of a multiple torch type plasma spray coating apparatus is reduced by about 40% as compared with that of the prior art, and the outer appearance thereof is improved.

The above description has been made with respect to the case in which the plasma generation device according to the present invention is applied to the plasma spraying and synthesization of diamond, but the present invention can be effectively applied to the processing of substances such as the cutting and jointing of metal and ceramics, the generation and sintering of fine particles, and a surface treatment and the like such as a surface improvement effected by using generated active ions, atoms and the like, making use of the feature of the present invention, in addition to the above applications. In these cases, since the present invention can use various kinds of gases as a plasma gas, it is applicable to a wide variety of fields.

What is claimed is:

1. A multiple torch plasma generation device, of the type having a main torch and an auxiliary torch, the main torch being disposed such that the axis of said main torch intersects the axis of the said auxiliary torch, said main and auxiliary torches including first and second narrow ports formed on the extreme end of the said main and auxiliary torches, respectively, to let an arc pass, characterized by means for forming a gas vortex flow upstream of said first narrow port, means for forming a gas vortex flow upstream of said second narrow port so as to prevent said arc from contacting said second narrow port, and wherein said second narrow port is smaller in diameter than said first narrow port.

2. A multiple torch type plasma generation device as defined in claim 1, wherein each of said means for forming a vortex gas flow includes at least one tangential vortex flow forming defined in an outer casing of said torch.

3. A multiple torch type plasma generation device according to claim 2, wherein a plurality of said insulators and casings are coaxially disposed.

4. A multiple torch type plasma generation device according to claim 2, wherein said insulators and said casing have substantially the same diameter.

5. A multiple torch type plasma generation device as defined in claim 2, wherein said insulators are composed of heat and electrically resistant material.

6. A multiple torch type plasma generation device as defined in claim 5, wherein said insulators are ceramic.

7. A multiple torch type plasma generation device as defined in claim 1, wherein a plurality of auxiliary torches are provided.

8. A multiple torch type plasma generation device, comprising a main torch and an auxiliary torch wherein said auxiliary torch is disposed such that the axis of said main torch intersects the axis of said auxiliary torch for generating a hairpin arc between the main torch and the auxiliary torch, said main torch including a first narrow port formed on the extreme end of said main torch and said auxiliary torch including a second narrow port formed on the extreme end of said auxiliary torch, said arc passing through said first and second ports, characterized by said second narrow port being smaller in diameter than said first narrow port and a first means for forming a strong gas vortex flow inside an inner wall of said first narrow port and a second means for forming a strong gas vortex flow inside an inner wall of said second narrow port whereby said first and second means for forming a strong vortex flow prevent an arc generated in each said torch from contacting said first and second narrow ports.

9. A multiple torch type plasma generation device according to claim 8, wherein said first and second means for forming a vortex flow include a vortex flow forming hole provided in an insulator, and said first and second narrow ports are defined on respective outer casings of said torches.

10. A multiple torch type plasma generation device according to claim 9, wherein a plurality of said insulators and casings are coaxially disposed.

11. A multiple torch type plasma generation device as defined in claim 9, wherein said insulators and said casings have substantially the same diameter.

12. A multiple torch type plasma generation device as defined in claim 9, wherein said insulators are composed of a heat and electrically resistant material.

13. A multiple torch type plasma generation device as defined in claim 12, wherein said insulators are ceramic.

14. A multiple torch type plasma generation device as according to claim 8, wherein a plurality of auxiliary torches are provided.

15. A multiple torch type plasma generation device comprising:

- a main torch including a main torch casing, said main torch casing having a first narrow exit port and means for forming a vortex flow inside an inner wall of said first narrow port; and
- an auxiliary torch including an auxiliary torch start electrode and an auxiliary torch casing having a second narrow exit port, said second narrow exit port being smaller in diameter than said first narrow exit port, and wherein said extreme end of said auxiliary start electrode is located adjacent an exit surface of said second narrow exit port of said auxiliary casing, said auxiliary torch including means for forming a strong vortex flow inside an inner wall of said second narrow exit port to prevent an arc generated by said main and auxiliary torches from contacting said exit surface of said second narrow exit port.

16. A multiple torch type plasma generation device comprising:

- a main torch having a main cathode and a first narrow port at an extreme end of said main torch;
- an auxiliary torch having an auxiliary start electrode, said auxiliary torch including an auxiliary casing and a second narrow port at an extreme end of said auxiliary torch, said second narrow port being smaller in diameter than said first narrow port, said main torch and said auxiliary torch positioned such that the axis of said auxiliary torch intersects the axis of said main torch;
- said main torch having a vortex flow forming member having at least one hole through which plasma gas is injected;
- said auxiliary torch having a vortex flow forming member having at least one hole from which a plasma gas is injected in a tangential direction with respect to the circumference of the arc column of said auxiliary torch; and
- wherein the extreme end of said auxiliary torch start electrode located adjacent the exit surface of said second narrow port.

17. A method of generating plasma, wherein a steady hairpin arc is formed between a main torch and an auxiliary torch, said arc passing through a first narrow port provided on an extreme end of said main torch and a second narrow port at an extreme end of said auxiliary torch, said second narrow port having a smaller diameter than said first narrow port, said method comprising the steps of forming a gas vortex flow within said main torch and forming a gas vortex flow in said auxiliary torch for preventing said arc from contacting said first and second narrow ports.

18. The multiple torch plasma generation device as defined in claim 1, further including a start electrode carried within said auxiliary torch in spaced relation to a casing of said auxiliary torch, said means for forming said strong vortex flow including holes emitting gas into the interior of said casing, said holes located in said casing at a location along the length of said start electrode whereby said gas vortex flow is generated upstream of an end of said electrode.

19. The multiple torch plasma generation device as defined in claim 15, further including at least one hole from which plasma gas is injected into said auxiliary torch, said at least one hole positioned to emit said gas tangentially to said start electrode whereby said gas vortex flow is generated around said start electrode upstream of an end of said start electrode.

20. The multiple torch plasma generation device as defined in claim 16, wherein said at least one hole in said insulator is positioned to emit said gas tangentially to said start electrode whereby said gas vortex flow is generated around said start electrode upstream of said narrow port.

21. The method as defined in claim 17, wherein said step of forming a strong gas vortex flow within said torches includes forming said strong gas vortex flow upstream of ends of start electrodes in said main and auxiliary torches.

* * * * *

UNITED STATES PATENT AND TRADEMARK OFFICE

CERTIFICATE OF CORRECTION

PATENT NO. : 5,243,169

DATED : September 7, 1993

INVENTOR(S) : Haruo Tateno et al.

It is certified that error appears in the above-indentified patent and that said Letters Patent is hereby corrected as shown below:

On the Title Page, Item [57];

Abstract, line 5: "axial" should be --axis--;

column 2, line 26: "discharge" should be --discharged--;

column 3, line 29: "the axis a torch" should be --the axis of a torch--;

column 7, line 3: "vertex" should be --vortex--;

column 7, line 6: "vertex" should be --vortex--;

column 7, line 26: "vertex" should be --vortex--;

column 7, line 29: "vertex" should be --vortex--;

column 8, line 3: "vertex" should be --vortex--;

column 8, line 4: "vertex" should be --vortex--;

column 8, line 18: "vertex" should be --vortex--;

column 8, line 59: "and" should be --an--;

column 9, line 60: "plural the" should be --the plural--;

column 10, line 42, claim 2: after "forming" insert --hole provided in an insulator, and said narrow parts are--;

column 10, line 42, claim 2: after "in" delete "an outer casing" and insert therefor --respective outer casings--;

UNITED STATES PATENT AND TRADEMARK OFFICE

CERTIFICATE OF CORRECTION

PATENT NO. : 5,243,169
DATED : September 7, 1993
INVENTOR(S) : Haruo Tateno et al.

It is certified that error appears in the above-indentified patent and that said Letters Patent is hereby corrected as shown below:

column 10, line 43, claim 2: delete "torch" and insert therefor --torches--;
column 12, line 14, claim 16: after "electrode" insert --is--.

Signed and Sealed this

Thirty-first Day of May, 1994

*Attest:*

BRUCE LEHMAN

*Attesting Officer* *Commissioner of Patents and Trademarks*